United States Patent
Patterson et al.

(10) Patent No.: US 8,768,895 B2
(45) Date of Patent: Jul. 1, 2014

(54) SUBSEGMENTING FOR EFFICIENT STORAGE, RESEMBLANCE DETERMINATION, AND TRANSMISSION

(75) Inventors: R. Hugo Patterson, Mountain View, CA (US); Ming Benjamin Zhu, Palo Alto, CA (US)

(73) Assignee: EMC Corporation, Hopkinton, MA (US)

( * ) Notice: Subject to any disclaimer, the term of this patent is extended or adjusted under 35 U.S.C. 154(b) by 1131 days.

(21) Appl. No.: 11/804,578

(22) Filed: May 18, 2007

(65) Prior Publication Data

US 2008/0256326 A1  Oct. 16, 2008

Related U.S. Application Data

(60) Provisional application No. 60/925,514, filed on Apr. 19, 2007, provisional application No. 60/923,066, filed on Apr. 11, 2007, provisional application No. 60/922,996, filed on Apr. 11, 2007.

(51) Int. Cl.
*G06F 17/30* (2006.01)

(52) U.S. Cl.
USPC .......................................... 707/690; 707/699

(58) Field of Classification Search
CPC ......................................................... G06F 7/00
USPC .................. 707/610, 690, 698, 692, 999.101, 707/999.2–999.204
See application file for complete search history.

(56) References Cited

U.S. PATENT DOCUMENTS

| | | | | |
|---|---|---|---|---|
| 4,556,985 A | * | 12/1985 | Hongo | 382/220 |
| 5,805,822 A | * | 9/1998 | Long et al. | 709/232 |
| 5,909,700 A | * | 6/1999 | Bitner et al. | 711/162 |
| 5,990,810 A | | 11/1999 | Williams | |
| 6,272,612 B1 | * | 8/2001 | Bordaz et al. | 711/203 |
| 6,470,329 B1 | * | 10/2002 | Livschitz | 1/1 |
| 6,823,436 B2 | * | 11/2004 | Krishnamurthy | 711/170 |
| 6,928,526 B1 | * | 8/2005 | Zhu et al. | 711/154 |
| 7,191,433 B2 | * | 3/2007 | Narad et al. | 717/140 |
| 7,478,113 B1 | * | 1/2009 | De Spiegeleer et al. | 1/1 |
| 7,673,099 B1 | * | 3/2010 | Beaverson et al. | 711/118 |
| 7,747,577 B2 | * | 6/2010 | Cannon et al. | 707/650 |

(Continued)

FOREIGN PATENT DOCUMENTS

WO  WO/03/092166 A1 *  6/2003  ............. H03M 7/30

OTHER PUBLICATIONS

Bobbarjung et al., "Improving Duplicate Elimination in Storage Systems," ACM Transactions on Storage, vol. V, No. N, Jul. 2006. pp. 1-23.

*Primary Examiner* — Robert Timblin
(74) *Attorney, Agent, or Firm* — Van Pelt, Yi & James LLP

(57) ABSTRACT

Transmitting or storing subsegments is disclosed. A data stream or a data block is received and broken into a plurality of segments. For at least one segment, the segment is broken into a plurality of subsegments. A previously stored or transmitted segment similar to the at least one segment is identified. A fingerprint is computed for at least one subsegment. And, using the fingerprint for the at least one subsegment, determining whether the at least one subsegment is identical to a subsegment of the previously stored or transmitted segment without directly comparing the content of the at least one subsegment with the content of the subsegment of the previously stored or transmitted segment.

59 Claims, 14 Drawing Sheets

(56) References Cited

U.S. PATENT DOCUMENTS

| | | | |
|---|---|---|---|
| 7,877,438 B2* | 1/2011 | Schrempp et al. | 709/203 |
| 2003/0005306 A1* | 1/2003 | Hunt et al. | 713/181 |
| 2003/0135623 A1* | 7/2003 | Schrempp et al. | 709/227 |
| 2005/0004954 A1* | 1/2005 | Soule, III | 707/203 |
| 2005/0177632 A1* | 8/2005 | Yach et al. | 709/224 |
| 2005/0210189 A1* | 9/2005 | Park | 711/112 |
| 2006/0020710 A1* | 1/2006 | Rabenold et al. | 709/236 |
| 2006/0155735 A1* | 7/2006 | Traut et al. | 707/101 |
| 2006/0206669 A1 | 9/2006 | Zhu et al. | |
| 2006/0212462 A1 | 9/2006 | Heller et al. | |
| 2008/0037587 A1* | 2/2008 | Roesch et al. | 370/474 |

* cited by examiner even as 8,768,895 B2

SUBSEGMENTING FOR EFFICIENT STORAGE, RESEMBLANCE DETERMINATION, AND TRANSMISSION

This application claims priority to U.S. Provisional Patent Application No. 60/925,514 entitled SUBSEGMENTING FOR EFFICIENT STORAGE, RESEMBLANCE DETERMINATION, AND TRANSMISSION filed Apr. 19, 2007 which is incorporated herein by reference for all purposes.

This application claims priority to U.S. Provisional Patent Application No. 60/923,066 entitled CLUSTER STORAGE USING SUBSEGMENTING filed Apr. 11, 2007 which is incorporated herein by reference for all purposes.

This application claims priority to U.S. Provisional Patent Application No. 60/922,996 entitled CLUSTER STORAGE USING DELTA COMPRESSION filed Apr. 11, 2007 which is incorporated herein by reference for all purposes.

BACKGROUND OF THE INVENTION

One approach to efficiently store data is to prevent the redundant copying of data that are the same as something previously stored (e.g., data that is to be stored on a backup drive that has stayed the same between backups). This efficient storage is achieved by dividing the data streams from data sources into segments and storing the segments or a reference to a similar segment and a delta on a storage device. During subsequent storage operations, the data streams are again segmented and the data stream segments are looked up in an index to determine whether a similar data segment was already stored previously. If a similar segment is found, the data segment is not stored again, instead a reference to the similar segment and a difference between the stored segment and the data stream segment are stored; Otherwise, the new data segment and a new index identifier are stored. However, in order to calculate the difference between the similar stored segment and the new segment requires reading back the similar stored segment. This can cause performance issues with regard to the storage device and traffic to and from the storage device. It would be beneficial if performance could be maintained or improved without sacrificing storage efficiency. Similarly, when sending similar segments over a network to a remote machine, computing the delta between the new segment and a similar segment stored remotely can require sending the full segment over the network which is expensive in terms of network bandwidth. It would be beneficial if performance could be maintained or improved without sacrificing transmission efficiency.

BRIEF DESCRIPTION OF THE DRAWINGS

Various embodiments of the invention are disclosed in the following detailed description and the accompanying drawings.

DETAILED DESCRIPTION

Figure 1A:
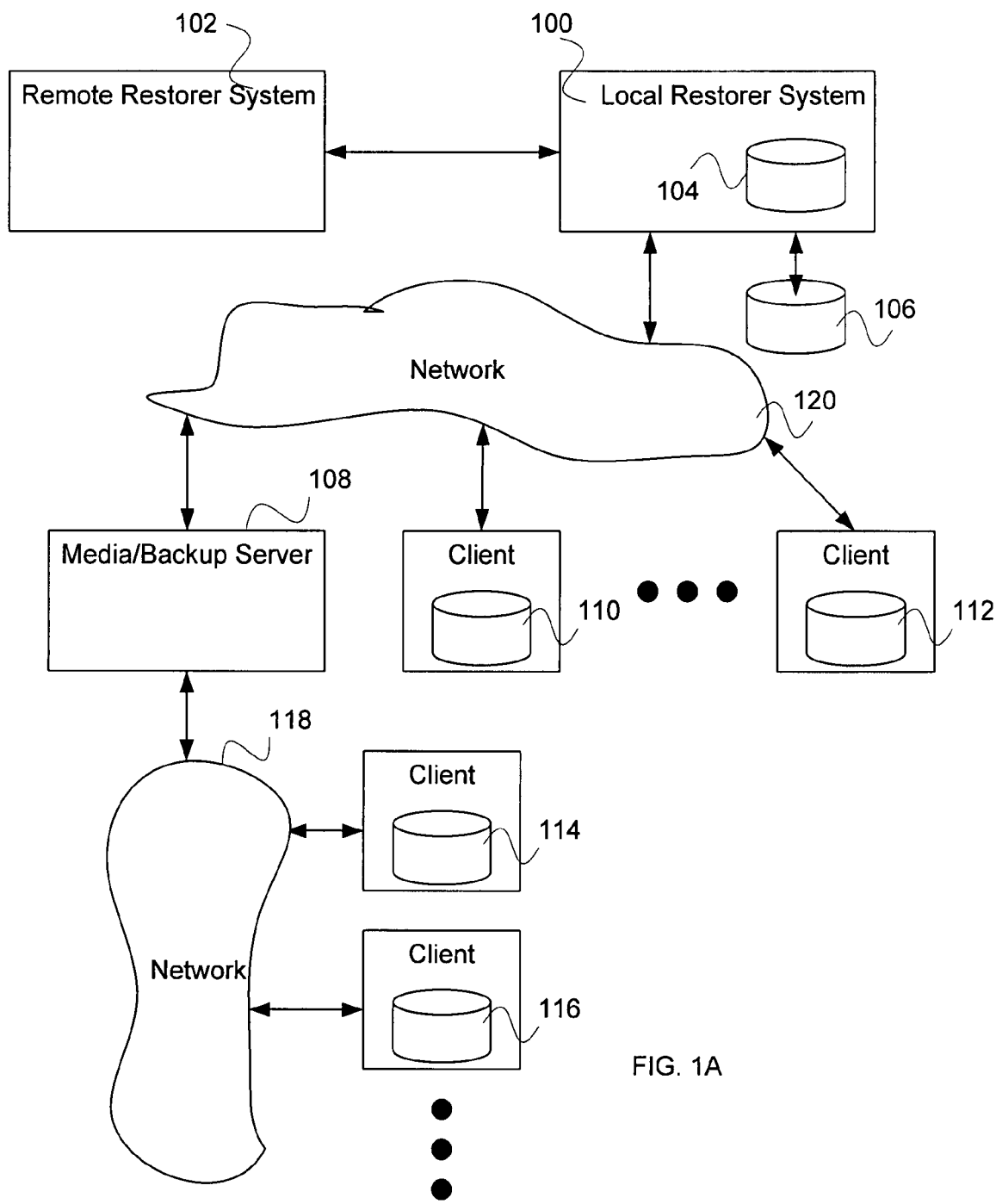
FIG. 1A is a block diagram illustrating an embodiment of a system for data storage that uses subsegmenting.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Storing or transmitting subsegments is disclosed. A data stream or data block is received and broken into segments. Each segment is broken into a plurality of subsegments. A fingerprint of a subsegment is used to determine if a subsegment has been previously stored or transmitted. A fingerprint of a subsegment is a number computed from the content of the subsegment that helps to identify the segment. For example, a hash of the data such as a Secure Hash Algorithm (SHA), Message Digest Algorithm 5 (MD5), RIPEMD-160 (RACE Integrity Primitives Evaluation Message Digest 160-bit version), a Rabin hash, or any other appropriate hash of the data.

In some embodiments, the fingerprint may have some collisions, where two dissimilar segments have the same fingerprint, as long as the collisions are infrequent. This is because a check sum of the segment can be used to detect a collision type error.

Using fingerprints enables determining matches to previously stored subsegments without reading or transferring the subsegment associated with the fingerprint. Because the fingerprint is smaller in size than its associated subsegment, the use of the fingerprint for determining matches improves the performance of storage system data access as well as the transfer efficiency to a remote storage system. Subsegmenting also enables using larger segments without sacrificing compression because identical subsegments can be referenced during storage of a segment; an entire large segment does not need to be identical to a previously stored segment, instead only a previously stored subsegment needs to be identical to a previously stored subsegment. Larger segments mean that, for a given amount of data, fewer segments need to be stored and managed which in turn increases system scalability. In some embodiments, a fingerprint (e.g., of a subsegment) is part of a file system data structure that associates a subsegment with an offset within a file.

In various embodiments, breaking into a segment or a subsegment is based on a portion of the content of the segment or subsegment, not based on the content, based on byte counts, based on hashes of bytes in the segment or subsegment, based on the boundaries of files included in the data stream, or any other appropriate manner for breaking into a segment or subsegment. In various embodiments, breaking into segments or subsegments includes creating from a data block or stream of segments or subsegments that overlap each other, that do not overlap each other, that have gaps between each other, or that include cases where they overlap each other and cases where they are not overlapping each other. The data block or stream, however, can be reconstructed from the segments or subsegments regardless of their overlapping or non-overlapping nature because information regarding the overlap or non-overlap is tracked so that reconstruction of the data block or stream can take place.

In some embodiments, the search for previously stored subsegments is performed over the subsegments associated with a similar previously stored segment. In various embodiments, a content based or non-content based tag is used to identify a previously stored segment similar to the in-coming new segment associated with the subsegment being processed. In various embodiments, a tag comprises a sketch, a fingerprint or hash of all or some of the bytes of the segment (e.g. of the first N bytes), some metadata included in the stream and associated with the segment such as a file name, a file size, a file create date and time, a file modify date and time, a file inode number, a hash of such metadata, or any other measure useful in identifying likely similar segments. In various embodiments, a tag comprises a tag based on the content of a segment or not based on the content of a segment. In some embodiments, a tag not based on the content includes: (when not included in a stream) a file name, a file size, a file create date and time, a file modify date and time, a file inode number, a hash of such metadata, or any other measure useful in identifying likely similar segments. In some embodiments, tags associated with a segment are stored (e.g., in an index) to be used to identify segments similar to an in-coming segment.

In some embodiments, a reference to and/or a fingerprint associated with the already stored identical subsegment is stored instead of the subsegment content. In some embodiments, the reference and/or the fingerprint associated with the subsegment is transmitted instead of the subsegment content to a system that already stores the subsegment.

In some embodiments, the references to and/or fingerprints associated with the subsegments of the segment are stored in close proximity to subsegments for efficient access together. In some embodiments, the references to and/or fingerprints associated with the subsegments of the segment are stored separately from the subsegments. In some embodiments, the fingerprints for all the subsegments of a segment are stored together for efficient access together (e.g., access in one read operation from a storage device or one transfer across a network or data bus). In some embodiments, the fingerprints for some or all of the subsegments are stored together as part of a file system data structure which associates subsegments with particular offsets within a file.

FIG. 1A is a block diagram illustrating an embodiment of a system for data storage using subsegmenting. In the example shown, local restorer system 100 stores information without loss of information in an input data stream that enables restoration of data originally stored on a client system in the event that the data on the client system is no longer available. Information is stored on an internal storage device 104 or an external storage device 106 of local restorer system 100. In various embodiments, internal storage device 104 comprises one storage device or a plurality of storage devices and/or external storage device 106 comprises one storage device or a plurality of storage devices. Local restorer 100 is in communication with remote restorer 102. Remote restorer 102 stores a copy of information that is stored on local restorer system 100 also enabling restoration of data originally stored on a client system. In various embodiments, local restorer 100 is in communication with remote restorer 102 using a dedicated communication link, one or more networks, a local area network, a wide area network, a storage area network, the Internet, a wired network, and/or wireless network. In some embodiments, a replicating system comprises a remote restorer system such as remote restorer 102.

Local restorer system 100 also communicates with a plurality of client systems with storage, represented in FIG. 1A by client systems with storage 110 and 112, using network 120. Local restorer system 100 also communicates with media/backup server 108 using network 120. In various embodiments, network 120 comprises one or more networks, a local area network, a wide area network, a storage area network, the Internet, a wired network, and/or wireless network. Media/backup server 108 communicates with a plurality of client systems with storage, represented in FIG. 1A by client system with storage 114 and 116, using network 118. In various embodiments, network 118 comprises one or more networks, a local area network, a wide area network, a storage area network, the Internet, a wired network, and/or wireless network. In some embodiments, media/backup server 108 backs up data on client systems with storage, which in turn is backed up to local restorer system 100.

In various embodiments, storage device 106 and/or 104 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Figure 1B:
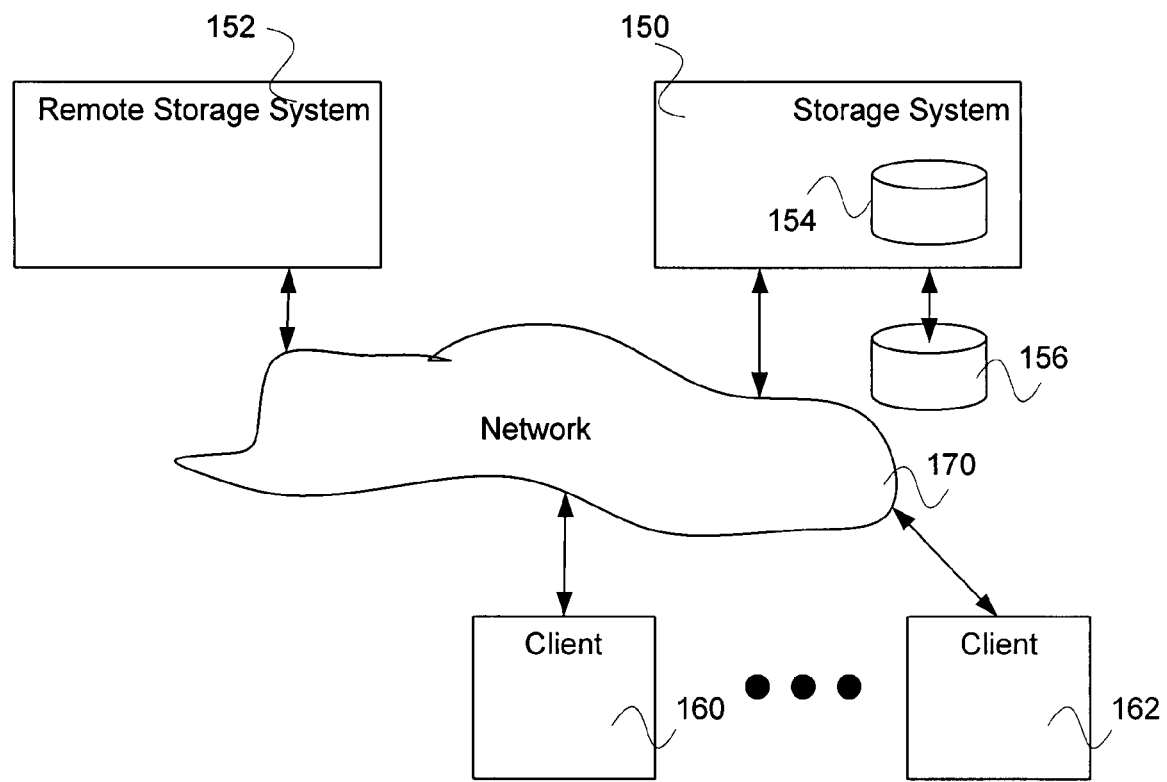
FIG. 1B is a block diagram illustrating an embodiment of a system for data storage that uses subsegmenting.

FIG. 1B is a block diagram illustrating an embodiment of a system for data storage using subsegmenting. In the example shown, storage system 150 stores information without loss of information in an input data stream that enables storage of data transmitted to or from a client system. Information is stored on an internal storage device 154 or an external storage device 156 of storage system 150. Storage system 150 communicates with a plurality of client systems, represented in FIG. 1B by client systems 160 and 162, using network 170. In various embodiments, network 170 comprises one or more networks, a local area network, a wide area network, a storage area network, the Internet, a wired network, and/or wireless network. Remote storage system 152 stores a copy of information that is stored on storage system 150. Remote storage system 152 enables access to data if storage system 150 is not available. Remote storage system 152 and storage system 150 communicate via network 170. In various embodiments, storage system 150 is in communication with remote storage system 152 using a dedicated communication link, one or more networks, or any other appropriate manner of communication between systems. In some embodiments, a replicating system comprises a remote storage system such as remote storage system 152. Each client system, such as 160 and 162, (when sending to storage system 150) and/or the storage system 150 (when sending to remote storage system 152) generate(s) a data stream and needs to send each segment of the data stream over network 170. Reduced data transfer is achieved over the network by sending a representation of a subsegment instead of the content of the subsegment in the event that the subsegment has been previously transmitted. In some embodiments, a client computes a sketch, sends it to storage system 150, which finds a similar segment. The client then sends the subsegment fingerprints of the segment to storage system 150 instead of the subsegment (i.e., segment) content. Traffic in either direction can be reduced by sending subsegment fingerprints instead of content. In various embodiments, internal storage device 154 comprises one storage device or a plurality of storage devices and/or external storage device 156 comprises one storage device or a plurality of storage devices.

In various embodiments, storage device 156 and/or 154 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. In various embodiments, remote storage system 152 and/or client systems (represented by 160 and 162) include one or more internal and/or external storage devices.

Figure 2A:
FIG. 2A is a block diagram illustrating an embodiment of a data stream or a portion of a data block.

FIG. 2A is a block diagram illustrating an embodiment of a data stream or a portion of a data block. In the example shown, data stream or portion of a data block 200 is shown. Data stream or portion of a data block 200 can be data that is being backed up, data that is being stored, data that is being transmitted, data that is being replicated on a remote site, or any other appropriate data stream or portion of a data block.

Figure 2B:
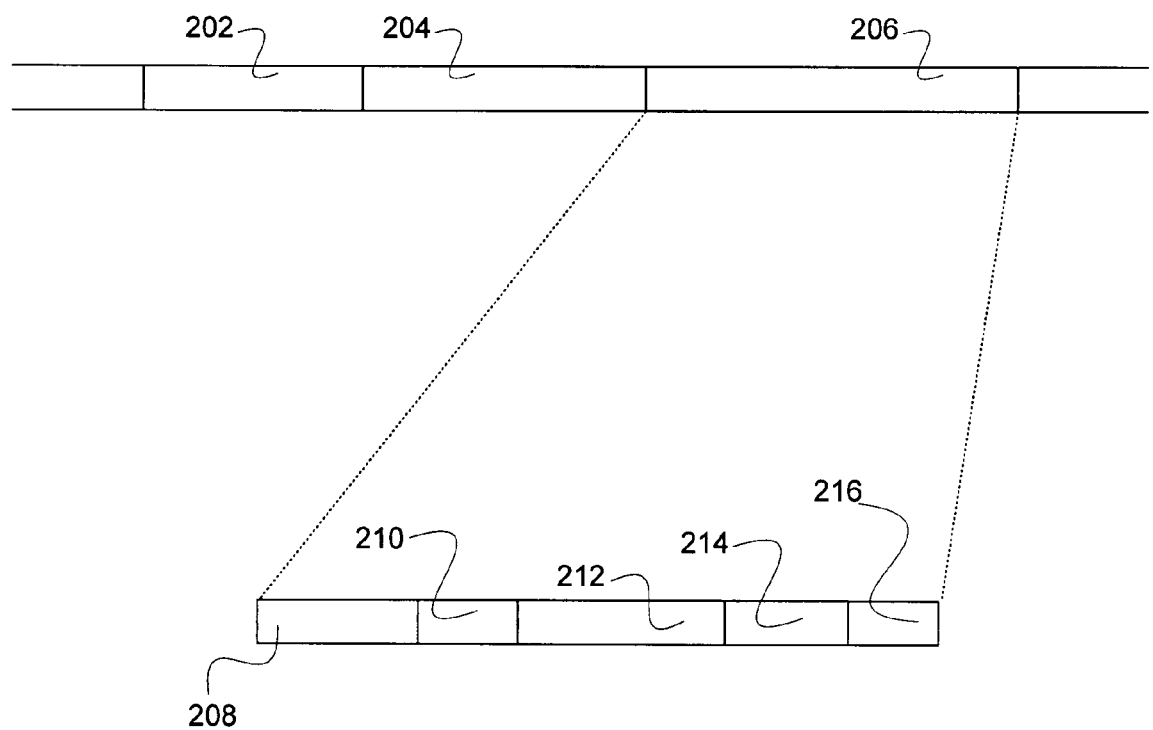
FIG. 2B is a block diagram illustrating an embodiment of a segmented data stream or a portion of a data block.

FIG. 2B is a block diagram illustrating an embodiment of a segmented data stream or a portion of a data block. In some embodiments, the segmented data stream or portion of a data block is the same data stream or portion of a data block represented in FIG. 2A. In the example shown, data stream or portion of a data block is segmented into a plurality of segments—for example, segments 202, 204, and 206. Segmenting of the data stream or portion of the data block can use content-based determination of segment boundaries (e.g., hash of some or all the content in a window is equal to a value), non-content based determination of segment boundaries (e.g., byte count), file-based segment boundaries, or any other appropriate way of breaking the data stream or data block into segments. In various embodiments, segments are the same size or are different sizes. Segment 206 is subsegmented into a plurality of subsegments. Subsegments are represented by 208, 210, 212, 214, and 216. Subsegmenting of the data stream or portion of the data block can use content-based determination of subsegment boundaries (e.g., hash of some or all of the content in a window is equal to a value), non-content based determination of subsegment boundaries (e.g., byte count), or any other appropriate way of breaking a segment into subsegments. In various embodiments, subsegments are the same size or are different sizes.

In some embodiments, the segments and/or subsegments are created using an anchoring function. In various embodiments, the anchoring function includes computing a hash of a sliding window of bytes, determining if the computed hash meets one or more predetermined criteria, and/or establishing a boundary in an algorithmic manner in or around the sliding window of bytes. In various embodiments, the anchoring function is based at least in part on at least a portion of content of the data stream or data block, uses fixed periodic boundaries, locates an anchor within a fixed periodic boundary using a hash function, uses two anchors and locating a boundary between the two anchors, uses file boundaries, directory boundaries, or any other appropriate anchoring function.

In some embodiments, the segments and/or subsegments could be overlapping. For example, subsegments of equal size could be created starting at each byte offset within the segment.

Figure 3A:
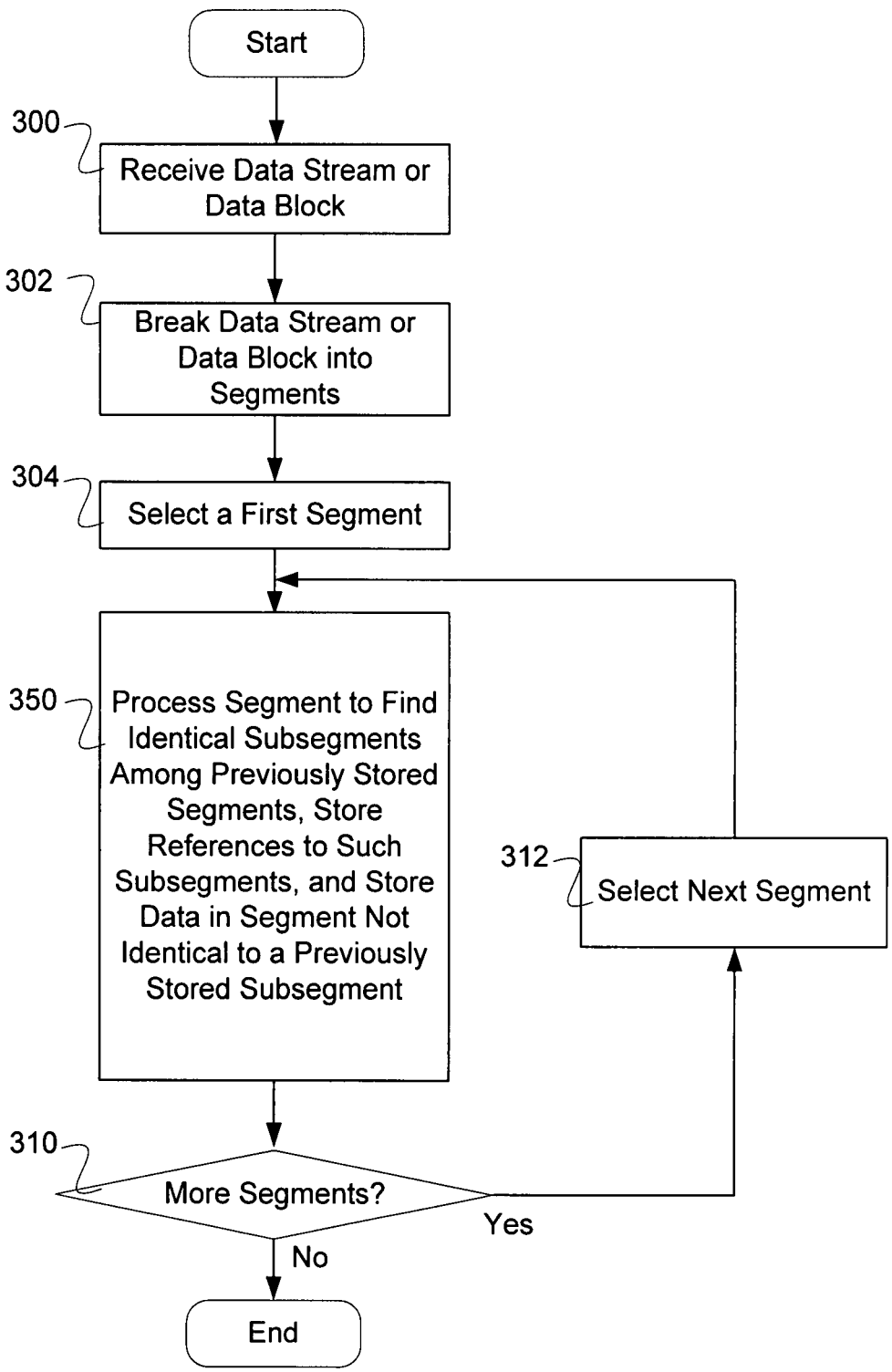
FIG. 3A is a flow diagram illustrating an embodiment of a process for subsegmenting a data stream or data block.

FIG. 3A is a flow diagram illustrating an embodiment of a process for subsegmenting a data stream or data block. In the example shown, in 300 a data stream or data block is received. In 302, the data stream or data block is broken into segments. In 304, a first segment is selected. In 350, the selected segment is processed to find identical subsegments among previously stored segments, references are stored to such subsegments (i.e., a reference is stored for a subsegment of the selected segment that refers to the previously stored identical subsegment), and data in the segment that is not identical to a previously stored subsegment is stored. In various embodiments, fingerprints to identify identical subsegments and/or tags to identify similar segments are stored on a local system, a remote system, or a replica system. In 310, it is determined if there are more segments to process. If so, then in 312 a next segment is selected and control passes to 350. If not, then the process ends.

Figure 3B:
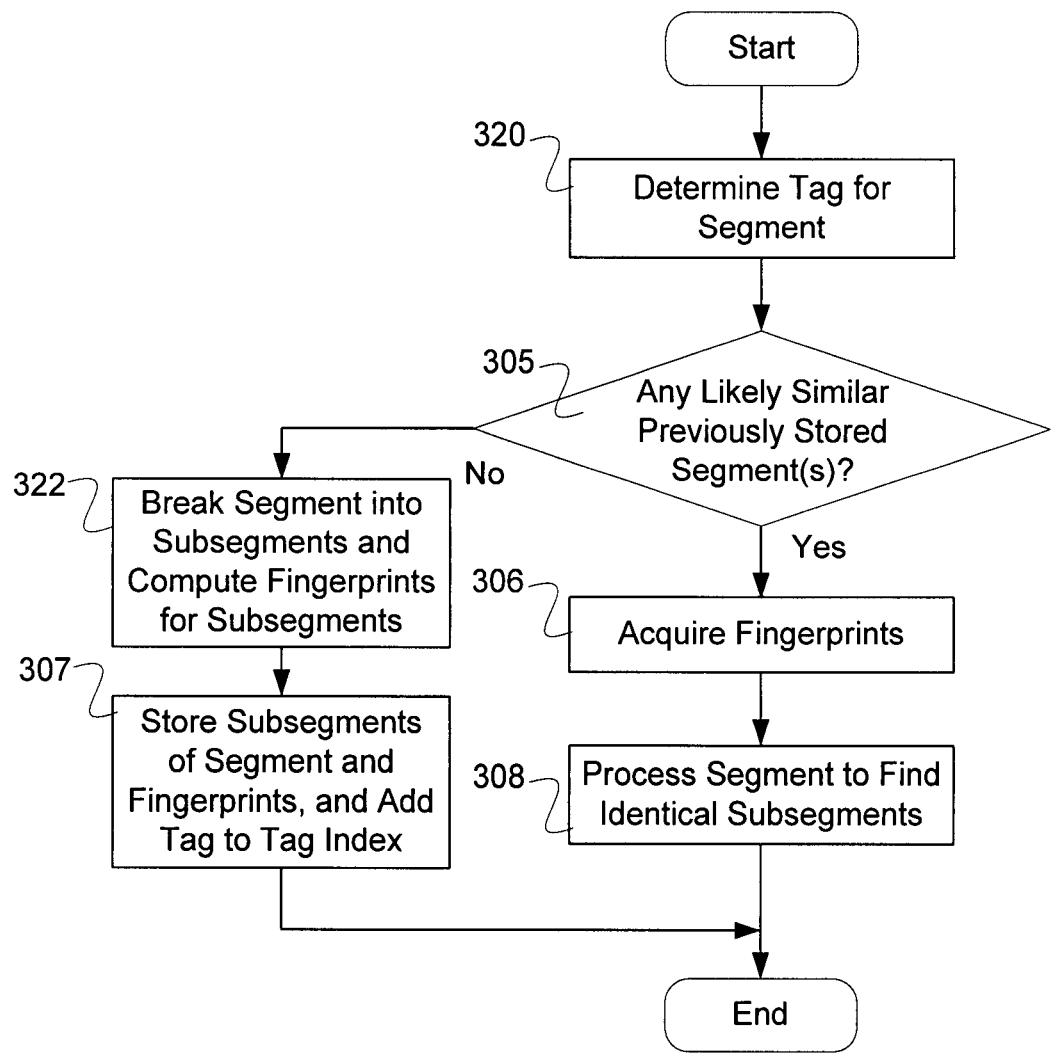
FIG. 3B is a flow diagram illustrating an embodiment of a process for processing segments locally.

FIG. 3B is a flow diagram illustrating an embodiment of a process for processing segments locally. In some embodiments, the process of FIG. 3B is used to implement 350 of FIG. 3A. In the example shown, in 320 a tag is determined for the segment. In various embodiments, the tag is a content based tag or a non-content based tag. In some embodiments, a content based tag comprises a sketch, a fingerprint or hash of some or all of the segment (e.g., the first N bytes), or metadata included in the stream associated with the segment or file associated with the segment such as a file size, a file create date and time, file modify date and time, or a file inode number. In some embodiments, a tag not based on content includes (when not included in the data stream or block): a file name, a file size, a create date and time, a file modify date and time, a file inode number, or any other associated metadata not included in the data stream or block. In 305, it is determined if there are any likely similar previously stored segment(s). If so, then in 306 fingerprints for subsegments of the similar previously stored segment(s) are acquired. In 308, segments are processed to find identical subsegments. If there are not any likely similar previously stored segments, then in 322 the segment is broken into subsegments and fingerprints are computed for the subsegments, and in 307 the subsegments of the segment and fingerprints are stored, and the tag is added to a tag index. In various embodiments, fingerprints of a segment are stored together or separate from each other and together or separate from the subsegments of the segment. In some embodiments, the subsegment fingerprints are stored as part of a file system data structure that associates the subsegments with particular offsets within a file or segment.

In various embodiments, the fingerprints are read by reading stored fingerprints from a storage device, or any other appropriate manner of reading a fingerprint. Fingerprints associated with a given segment are substantially smaller than the segment itself, so reading or transferring only fingerprints reduces substantially the reading access times from storage devices and the transferred number of bytes from the storage devices.

In some embodiments, storing or transmitting fingerprints enables fingerprints to be used in place of a segment or a subsegment thereby saving storage space, transmission bandwidth, and/or compute time.

In some embodiments, fingerprints (e.g., the fingerprints associated with subsegments of a segment) for two or more subsegments of a similar previously stored segment are stored together and can therefore be easily acquired or retrieved together as a group (i.e., in one access from a storage device). In various embodiments, the fingerprints of a similar previously stored segment are stored in close proximity to or separately from the subsegments and/or references of the segment.

In some embodiments, fingerprints for two or more subsegments of a plurality of previously stored segments are stored together so that they can be easily acquired or retrieved together as a group (i.e., in one access from a storage device).

In some embodiments, a similar previously stored segment is identified using resemblance. In some embodiments, resemblance is determined by comparing a summary feature set of a first segment with a summary feature set of a second segment. In some embodiments, a summary feature set is determined by selecting a plurality of either fixed length or variable length parts or shingles of a first segment; for each shingle, computing a plurality of values by applying a set of functions to each shingle; and from all the values computed for all the shingles, selecting a first subset of values. In some embodiments, the first subset of values is used in determining resemblance between the first segment and a second segment.

In various embodiments, similar segments are located based on the name of a file or directory included in the data stream or data block or based on the name of a file or directory not included in the data stream or data block (e.g., associated with the file as metadata).

Figure 4A:
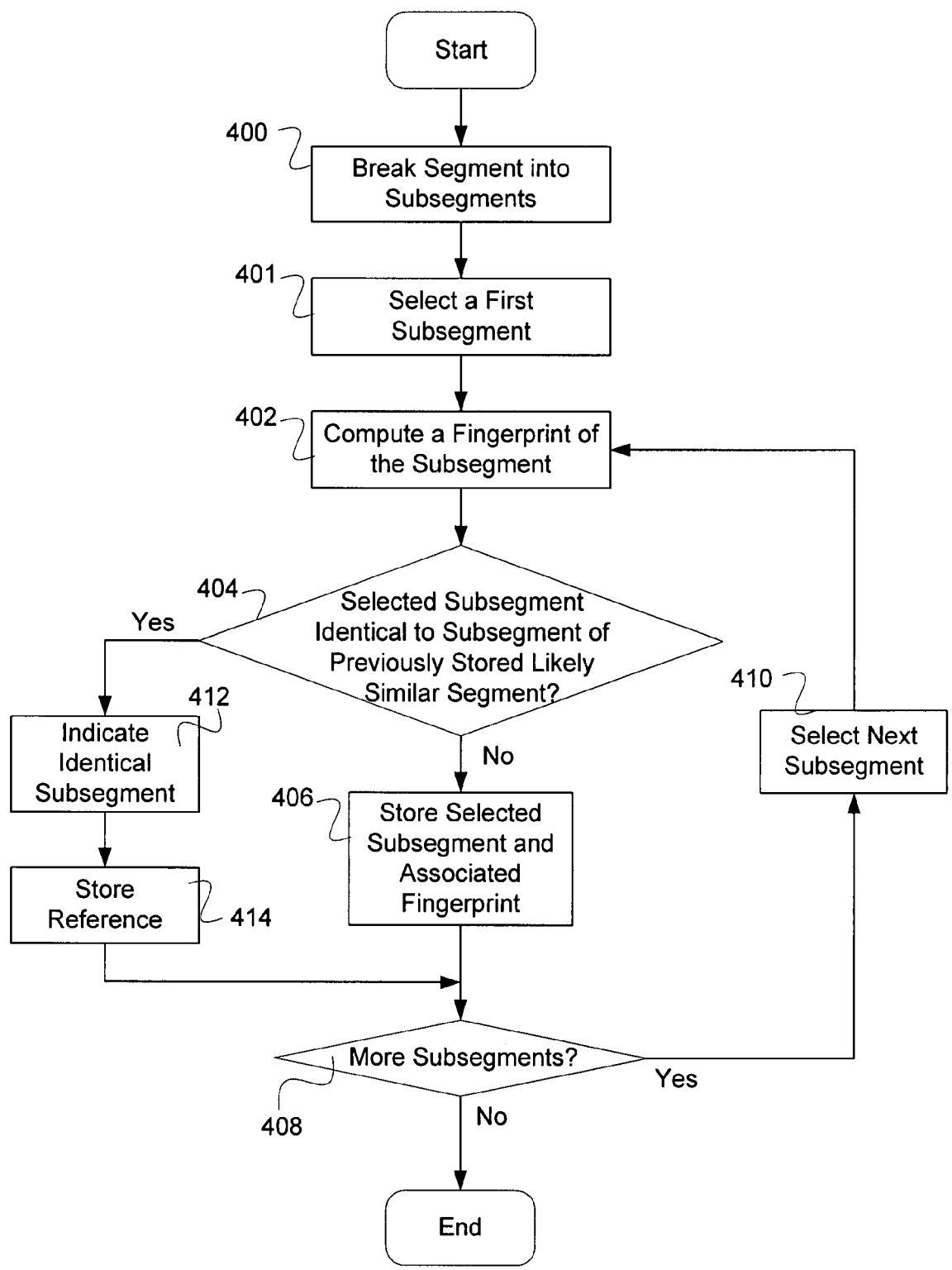
FIG. 4A is a flow diagram illustrating an embodiment of a process for processing subsegments.

FIG. 4A is a flow diagram illustrating an embodiment of a process for processing subsegments. In various embodiments, the process of FIG. 4A is used to implement 308 of FIG. 3B or 716 of FIG. 7. In the example shown, in 400 the segment is broken into subsegments. In 401, a first subsegment is selected. In 402, a fingerprint of the subsegment is computed. In 404, it is determined if the selected subsegment is identical to a subsegment of a previously stored likely similar segment. The determination of a subsegment being identical to another uses fingerprints. If the selected subsegment is identical to a subsegment of a previously stored likely similar segment, then in 412 it is indicated that the selected subsegment is identical, in 414 a reference is stored, and control passes to 408. If the selected subsegment is not identical to a subsegment of a previously stored likely similar segment, then in 406 the selected subsegment and associated fingerprint are stored and control passes to 408. In some embodiments, the associated fingerprint is not stored—for example, if the fingerprint is not required in determining subsequent matches or the fingerprint is calculated on the fly when required. In 408, it is determined if there are more subsegments to process. If there are, then in 410 the next subsegment is selected and control passes to 402. If not, then the process ends.

Figure 7:
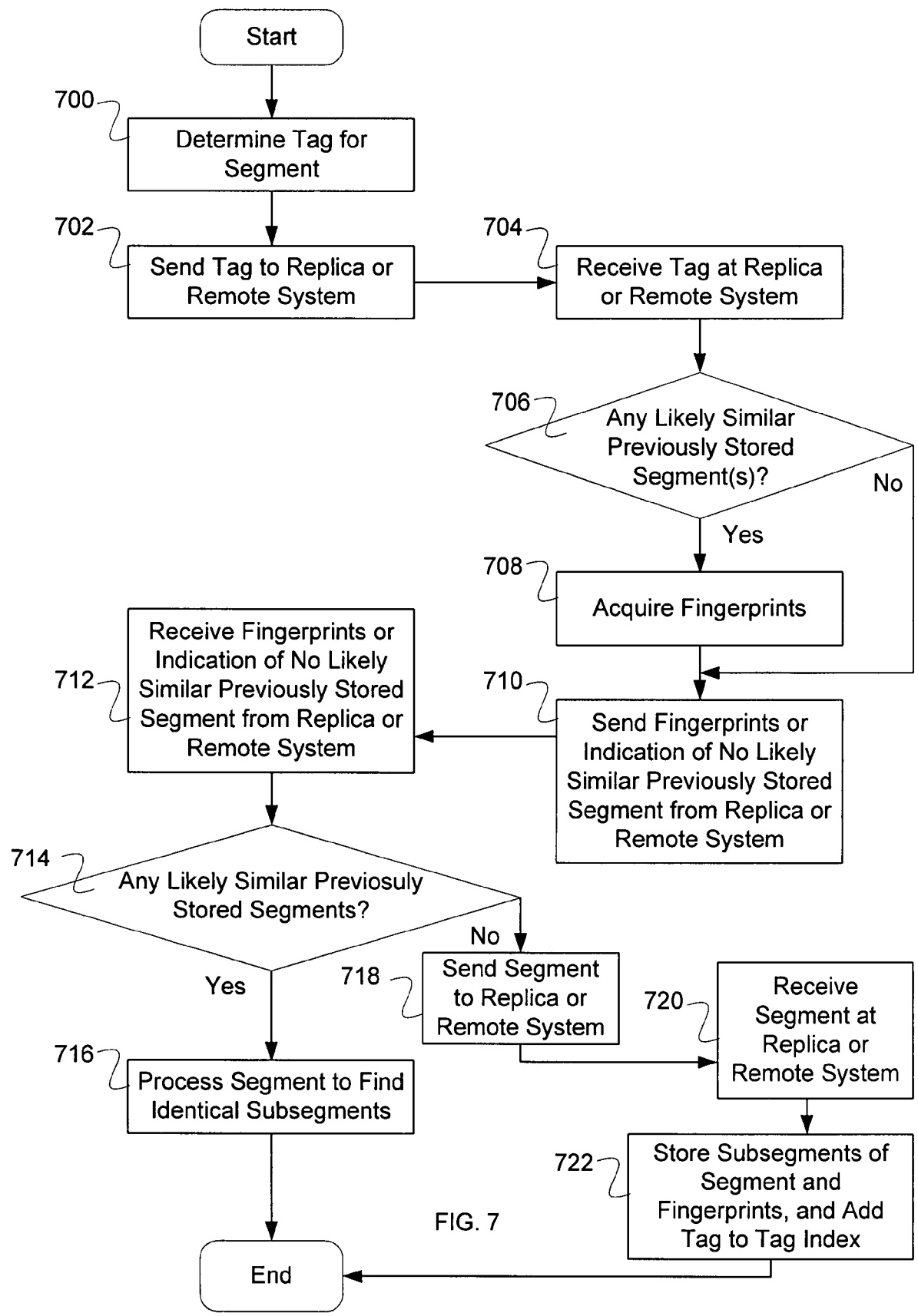
FIG. 7 is a flow diagram illustrating an embodiment of a process for processing segments on a replica or remote system

In the event that the process of FIG. 4A is used to implement 716 of FIG. 7, storing of references for 414 and storing of the selected subsegment and associated fingerprint for 406 includes sending to a replica or remote system for storing of the reference or subsegment and associated fingerprint.

In some embodiments, the subsegment processing is with regards to transmitting a subsegment or replicating a subsegment. In these cases, the comparisons are with previously transmitted or replicated subsegments and after indicating that the subsegment is identical to a previously transmitted or replicated subsegment, transmitting or replicating by using a reference instead of the subsegment content.

Figure 4B:
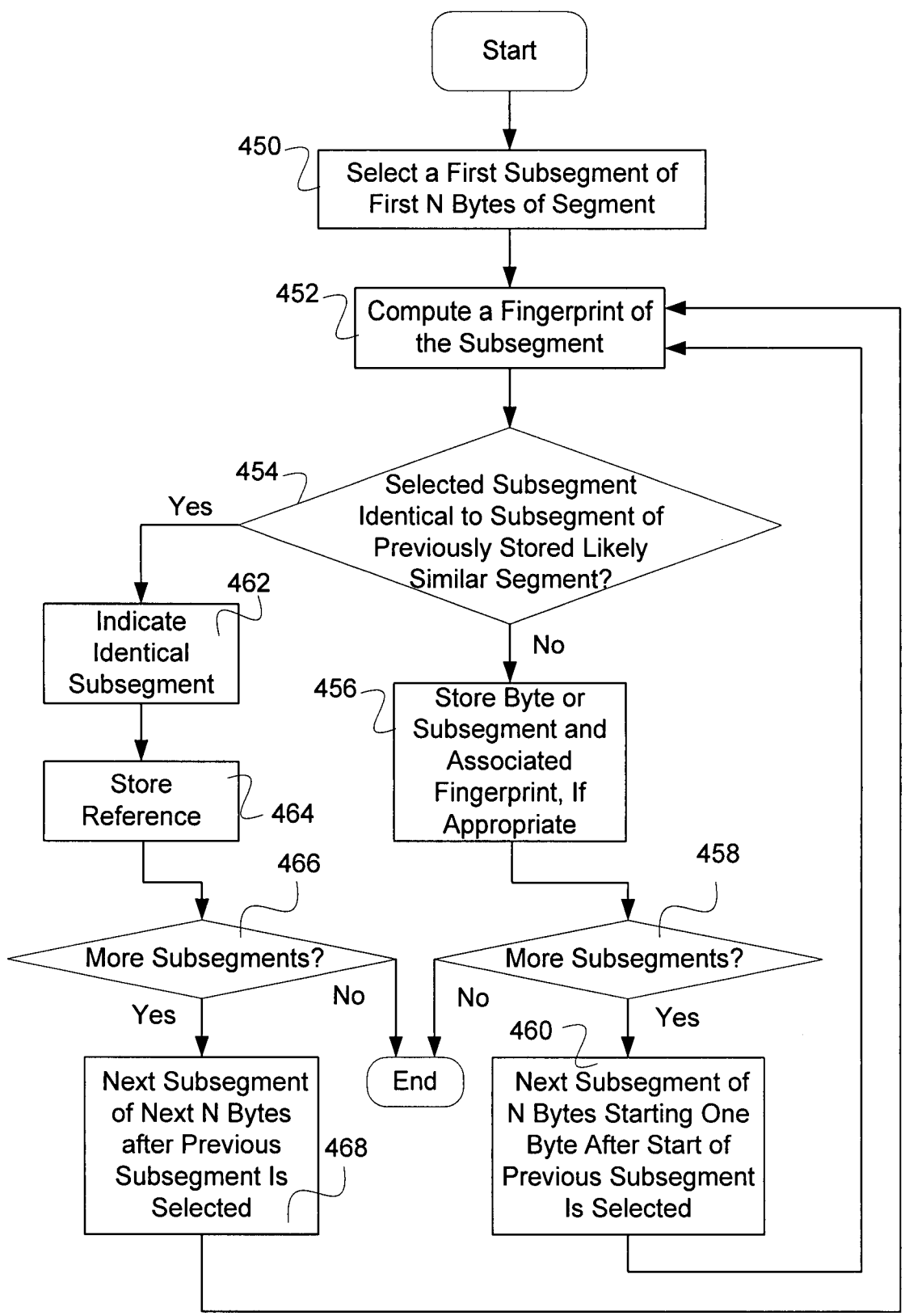
FIG. 4B is a flow diagram illustrating an embodiment of a process for processing subsegments.

FIG. 4B is a flow diagram illustrating an embodiment of a process for processing subsegments. In various embodiments, the process of FIG. 4B is used to implement 308 of FIG. 3B or 716 or FIG. 7. In the example shown, in 450 a first subsegment is selected of the first N bytes of the segment. In 452, a fingerprint of the subsegment is computed. In 454, it is determined if the selected subsegment is identical to a subsegment of a previously stored likely similar segment. The determination of a subsegment being identical to another uses fingerprints.

If the selected subsegment is identical to a subsegment of a previously stored likely similar segment, then in 462 it is indicated that the selected subsegment is identical, and in 464 a reference is stored. In 466, it is determined if there are more subsegments. If not, then the process ends. If there are more subsegments, then in 468 a next subsegment of next N bytes after previous subsegment is selected, and control passes to 452.

If the selected subsegment is not identical to a subsegment of a previously stored likely similar segment, then in 456 the byte is stored or buffered for later storage and/or, if appropriate, the selected subsegment and associated fingerprint are stored. For example, the sliding window of subsegments has not found a matching subsegment after sliding the starting byte over N bytes past a previously saved subsegment or previously found matching subsegment. In 458, it is determined if there are more subsegments. If not, the process ends. If there are more subsegments, then in 460 the next subsegment of N bytes starting one byte after previous subsegment is selected, and control passes to 452.

In the event that the process of FIG. 4B is used to implement 716 of FIG. 7, storing of references for 464 and storing of the selected subsegment and associated fingerprint for 456 includes sending to a replica or remote system for storing of the reference or subsegment and associated fingerprint. In various embodiments, the processes of FIGS. 8A and/or 8B are used to store the subsegments, fingerprints, and/or references on a remote or replica system.

Figure 5:
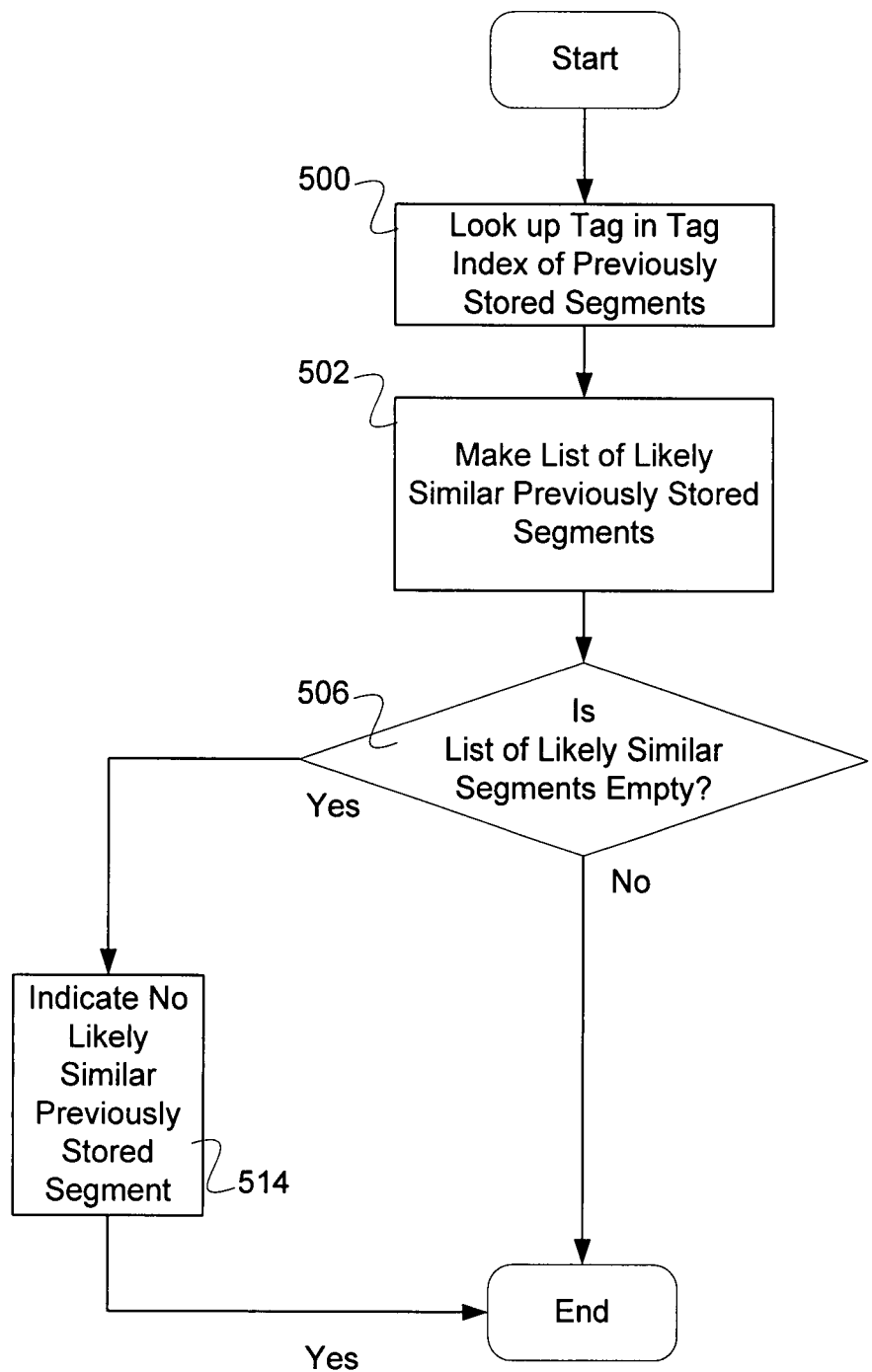
FIG. 5 is a flow diagram illustrating an embodiment of a process for identifying likely similar segments.

FIG. 5 is a flow diagram illustrating an embodiment of a process for identifying likely similar segments. In various embodiments, the process of FIG. 5 is used to implement 305 of FIG. 3B, 706 of FIG. 7, or 908 of FIG. 9. In the example shown, in 500 a tag is looked up in a tag index of previously stored segments. In various embodiments, a tag comprises a content-based tag, a file name, or other external metadata. The tag index can be in memory, on disk, or in any other appropriate index location. Also, the tag can be one or more hash tables (e.g., for sketch features), a tree structure, part of file system data structures (e.g., a directory where you look up the file name), or any other appropriate index type. In 502, a list is made of likely similar previously stored segments. In some embodiments, the list is made using the tag. In 506, it is determined if the list of likely similar segments is empty. If so, then in 514 it is indicated that there are no likely similar previously stored segments, and the process ends. If not, then the process ends.

In various embodiments, the tags are read by finding them in an in-memory data structure, by reading stored tags from a storage device, by receiving tags from a replica system, by receiving tags from a remote system, or any other appropriate manner of reading a tag. Tags associated with a given segment are substantially smaller than the segment itself, so reading or transferring only tags reduces substantially the reading access times from storage devices and the transferred number of bytes from the storage devices.

In some embodiments, tags are calculated on the fly from a segment, when available, to save storage space or for convenience. In some embodiments, storing or transmitting tags enables tags to be used in place of a segment thereby saving storage space, transmission bandwidth, and/or compute time.

In some embodiments, tags for two or more similar previously stored segments are stored together and can therefore be easily acquired or retrieved together as a group (i.e., in one access from a storage device). In various embodiments, the tags of similar previously stored segments are stored in close proximity to or separately from the content of the segments and/or references of the segments.

In some embodiments, tags for a plurality of previously stored segments are stored together so that they can be easily acquired or retrieved together as a group (i.e., in one access from a storage device).

Figure 6:
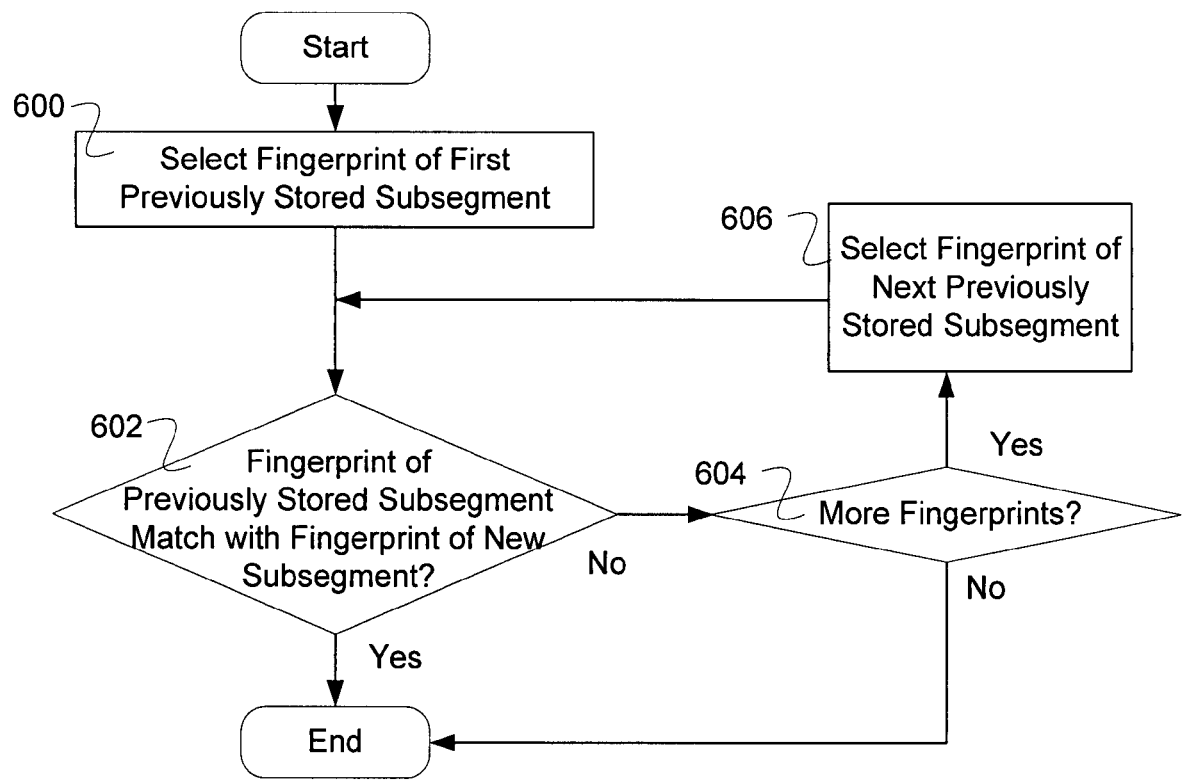
FIG. 6 is a flow diagram illustrating an embodiment of a process for determining if a subsegment is identical to a previously stored subsegment.

FIG. 6 is a flow diagram illustrating an embodiment of a process for determining if a subsegment is identical to a previously stored subsegment. In various embodiments, the process of FIG. 6 is used to implement 404 of FIG. 4A, 454 of FIG. 4B, or 1104 of FIG. 11. In the example shown, in 600 a fingerprint of a first previously stored subsegment is selected. In some embodiments, the previously stored subsegment is a subsegment of a likely similar segment. In 602, it is determined if the fingerprint of the previously stored subsegment matches with the fingerprint of the new subsegment. If so, then the process ends. If not, then in 604, it is determined if there are more fingerprints. If so, then in 606 a fingerprint of a next previously stored subsegment is selected, and control passes to 602.

FIG. 7 is a flow diagram illustrating an embodiment of a process for processing segments on a replica or remote system. In some embodiments, the process of FIG. 7 is used to implement 350 of FIG. 3A. In the example shown, in 700 a tag is determined for a segment. In various embodiments, the tag is a content based tag or a non-content based tag. In some embodiments, a content based tag comprises a sketch, a fingerprint or hash of some or all of the segment (e.g., the first N bytes), or metadata included in the stream associated with the segment or file associated with the segment such as a file size, a file create date and time, file modify date and time, or a file inode number. In some embodiments, a tag not based on content includes (when not included in the data stream or block): a file name, a file size, a create date and time, a file modify date and time, a file inode number, or any other associated metadata not included in the data stream or block. In 702, the tag is sent to a replica or a remote system. In 704, tag is received at the replica or remote system. In 706, it is determined if there are any likely similar previously stored segment(s). If so, then in 708 fingerprints for subsegments of the similar previously stored segment(s) are acquired. If there are not any likely similar previously stored segments, then control is passed to 710. In 710, fingerprints or an indication of no likely similar previously stored segments is/are sent from the replica/remote system. In 712, fingerprints or an indication of no likely similar previously stored segments is/are received from the replica/remote system. In 714, it is determined if there are any likely similar previously stored segments. If there are, then in 716, the segment is processed to find identical subsegments. In various embodiments, 716 is implemented using the process of FIG. 4A or 4B where the storage of a reference (e.g., 414 or 464) or a subsegment and associated fingerprint (e.g., 406 or 456) includes sending the reference or subsegment and associated fingerprint to a remote or replica system for storage. In some embodiments, a search of subsegments of the likely previously stored segments is performed using a comparison of fingerprints. If there are no likely similar previously stored segments on replica system, then in 718, the segment is sent to replica or remote system. In 720, the segment is received by replica or remote system. In 722, the subsegments of the segment and associated fingerprints are stored, and the tag is added to a tag index.

In some embodiments, the process enables the system to be more efficient about the number of bytes transmitted between a client and a remote system by sending a representation such as a fingerprint instead of a full subsegment.

Figure 8A:
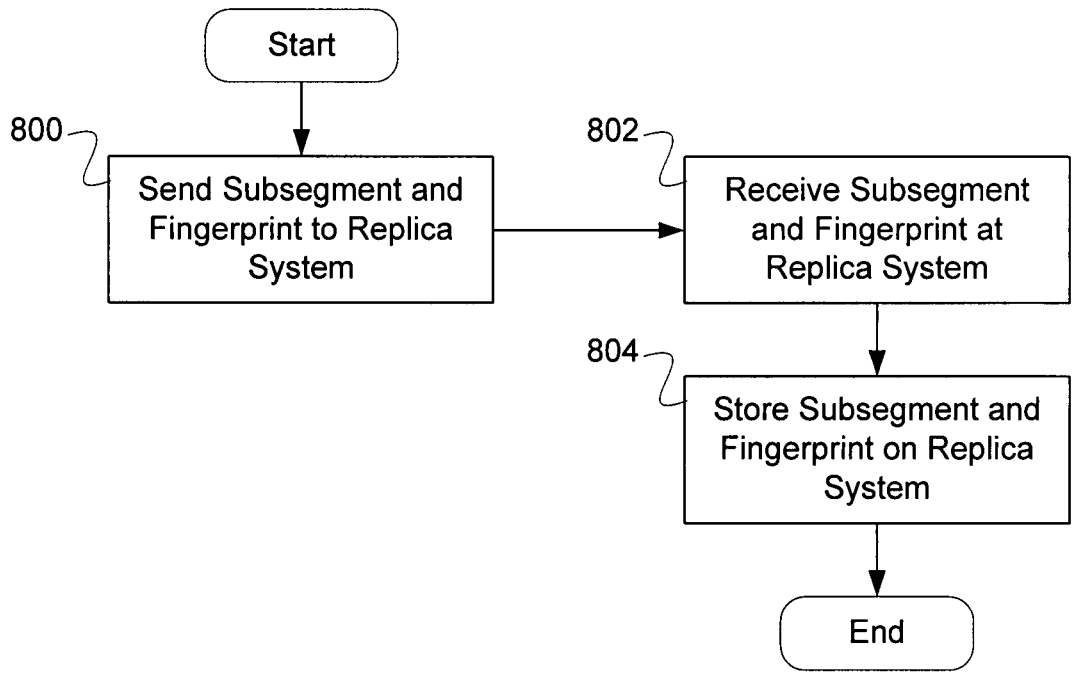
FIG. 8A is a flow diagram illustrating a process for storing a subsegment on a replica system.

FIG. 8A is a flow diagram illustrating a process for storing a subsegment on a replica system. In some embodiments, the process of FIG. 8A is used to implement 406 of FIG. 4A or 456 of FIG. 4B. In the example shown, in 800 a subsegment and fingerprint is sent to a replica system. In some embodiments, the fingerprint is not sent—for example, if the fingerprint is already known by the replica system or the fingerprint is to be calculated when required. In 802, the subsegment and fingerprint is received at the replica system. In 804, the subsegment and fingerprint are stored on the replica system.

Figure 8B:
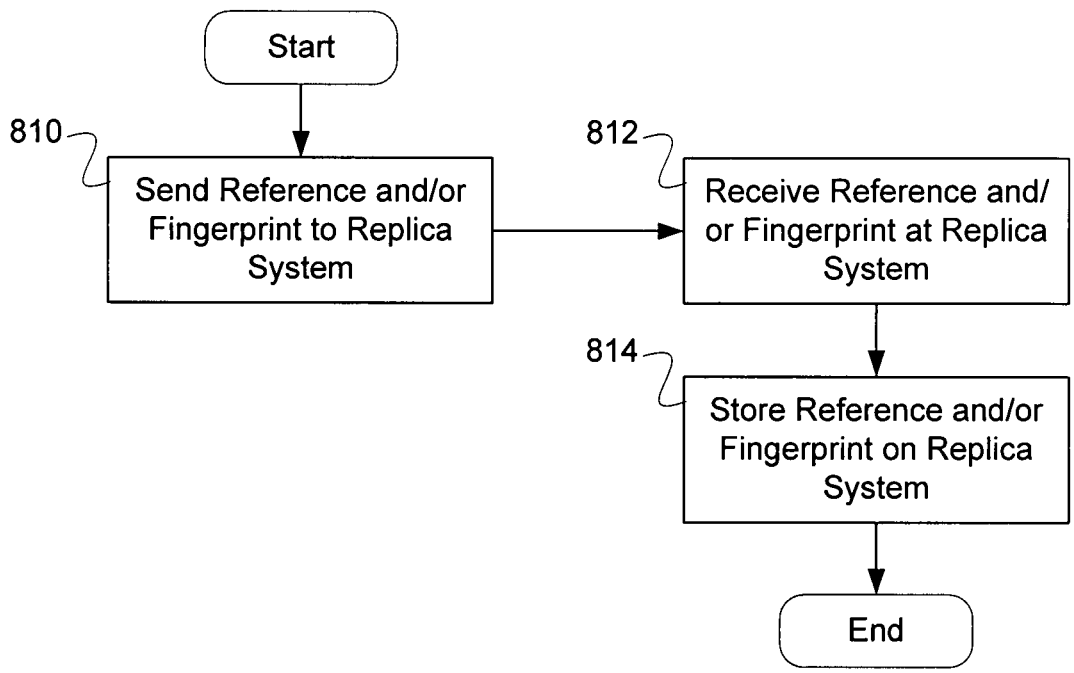
FIG. 8B is a flow diagram illustrating a process for storing a reference to a subsegment on a replica system.

FIG. 8B is a flow diagram illustrating a process for storing a reference to a subsegment on a replica system. In some embodiments, the process of FIG. 8B is used to implement 414 of FIG. 4A or 464 of FIG. 4B. In the example shown, in 810 a reference and/or fingerprint is/are sent to a replica system. In 812, the reference and/or fingerprint is received at the replica system. In 814, the reference and/or fingerprint are stored on the replica system.

In some embodiments, the replica system as mentioned in the processes of FIGS. 8A and 8B is used as a remote system that receives data from a client where the remote system is not a replica. The processes enable the system to be efficient about the number of bytes transmitted between a client and a remote system. In some embodiments, the replica/remote system uses the references to matching subsegments to create a full image of the similar segment and stores the full segment. In this case, the optimization is just for data transfer not data storage.

Figure 9:
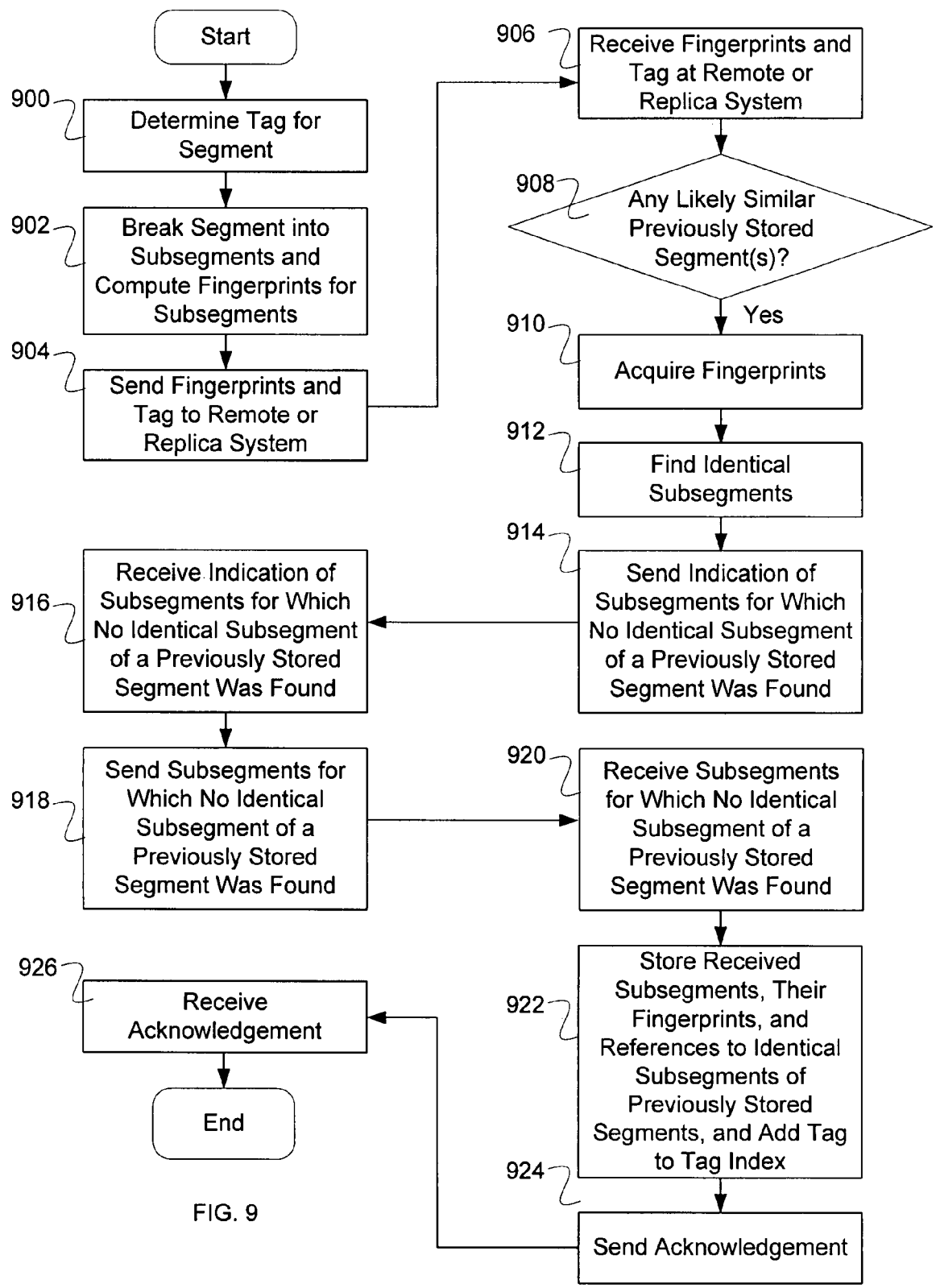
FIG. 9 is a flow diagram illustrating an embodiment of a process for processing segments on a replica or remote system

FIG. 9 is a flow diagram illustrating an embodiment of a process for processing segments on a replica or remote system. In some embodiments, the process of FIG. 9 is used to implement 350 of FIG. 3A. In the example shown, in 900 a tag is determined for a segment. In various embodiments, the tag is a content based tag or a non-content based tag. In some embodiments, a content based tag comprises a sketch, a fingerprint or hash of some or all of the segment (e.g., the first N bytes), or metadata included in the stream associated with the segment or file associated with the segment such as a file size, a file create date and time, file modify date and time, or a file inode number. In some embodiments, a tag not based on content includes (when not included in the data stream or block): a file name, a file size, a create date and time, a file modify date and time, a file inode number, or any other associated metadata not included in the data stream or block. In 902, the segment is broken into subsegments, and fingerprints are computed for the subsegments. In 904, the tag and fingerprints are sent to a replica or a remote system. In 906, tag and fingerprints are received at the remote or replica system. In 908, it is determined if there are any likely similar previously stored segment(s). If so, then in 910 fingerprints are acquired, and in 912 the segment is processed to find identical subsegments. If there are no likely similar previously stored segments, then control is passed to 914. In 914, an indication is sent of subsegments for which no identical subsegment of a previously stored segment was found. In 916, an indication is received of subsegments for which no identical subsegment of a previously stored segment was found. In 918, subsegments are sent for which no identical subsegment of a previously stored segment was found. In 920, the subsegments are received for which no identical subsegment of a previously stored segment was found. In 922, received subsegments, their fingerprints, and references to identical subsegments of previously stored segments are stored, and tag is added to tag index. In 924, an acknowledgement is sent. In 926, the acknowledgement is received, and the process ends.

In various embodiments, different combination of sending/receiving tags and/or fingerprints to identify duplicate subsegments are possible because comparisons and or calculations can be made either on the originating system or the remote or replica system. Sending/receiving fingerprints or tags, which are much smaller than the content of a segment or subsegment, is much more efficient with regards to traffic over the network or bus between the originating system and the remote or replica system.

Figure 10:
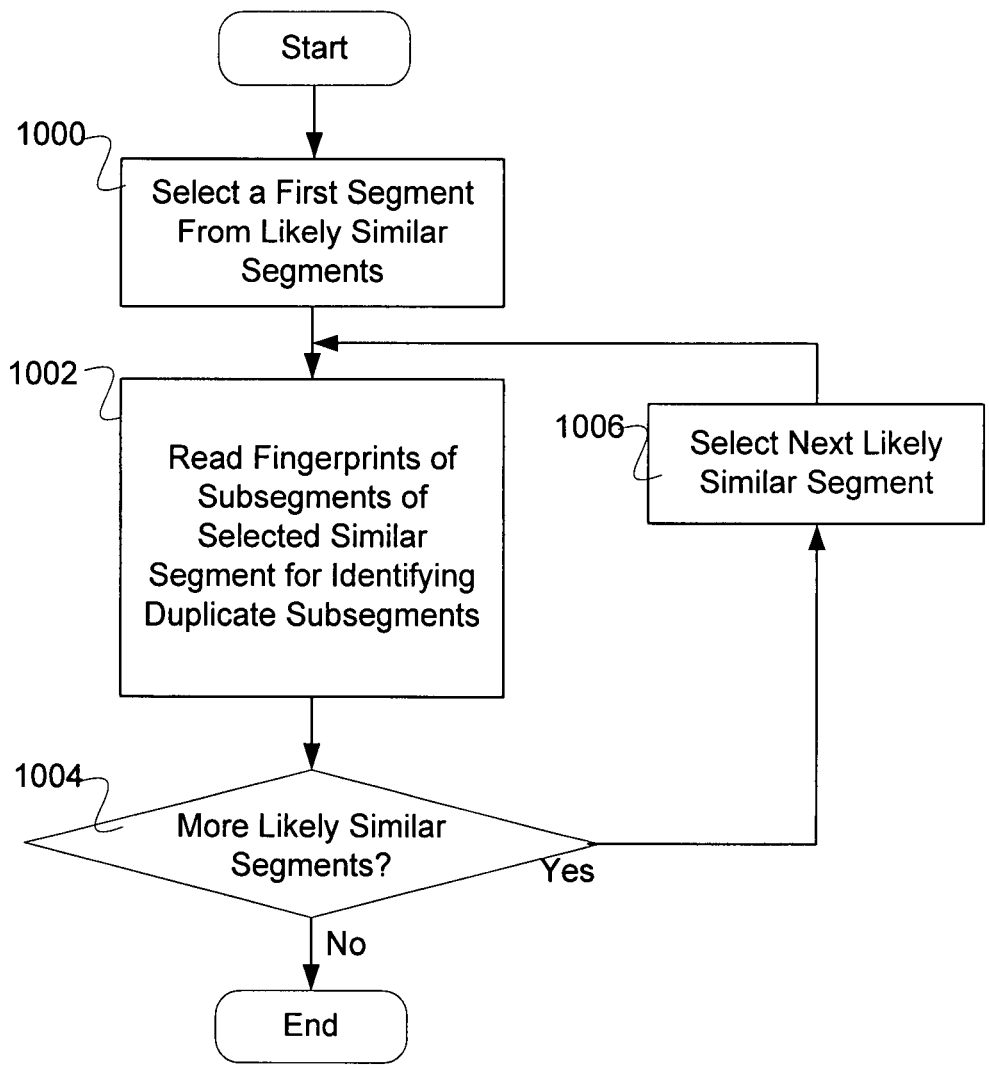
FIG. 10 is a flow diagram illustrating an embodiment of a process for acquiring fingerprints.

FIG. 10 is a flow diagram illustrating an embodiment of a process for acquiring fingerprints. In various embodiments, the process of FIG. 10 is used to implement 306 of FIG. 3, 708 of FIG. 7, or 910 of FIG. 9. In the example shown, in 1000 a first likely similar segment is selected. In 1002, the fingerprints of subsegments of the selected likely similar segment are read for identifying duplicate subsegments. In 1004, it is determined if there are more likely similar segments. If so, then the next likely similar segment is selected in 1006. If not, the process ends.

In some embodiments, fingerprints (e.g., the fingerprints associated with subsegments of a segment) for two or more or all subsegments of a likely similar segment are stored together and can therefore be easily acquired or retrieved together as a group (i.e., in one access from a storage device). In various embodiments, the fingerprints of a likely similar segment are stored in close proximity to or separately from the subsegments and/or references and/or tags of the segment.

In some embodiments, fingerprints for two or more or all subsegments of a plurality or all of previously stored segments are stored together so that they can be easily acquired or retrieved together as a group (i.e., in one access from a storage device).

In some embodiments, tags are stored and retrieved using a similar process to fingerprints.

Figure 11:
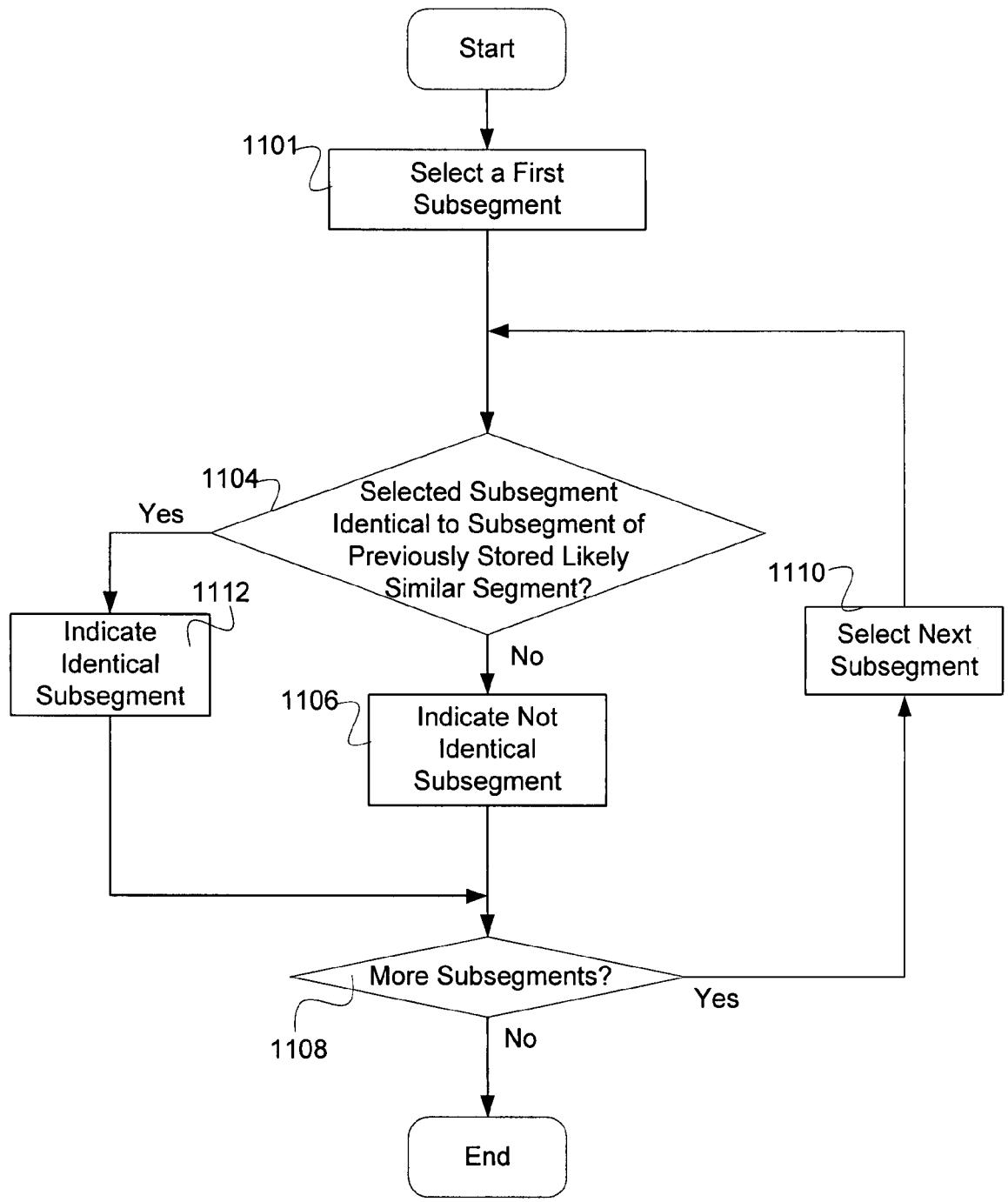
FIG. 11 is a flow diagram illustrating an embodiment of a process for finding identical subsegments.

FIG. 11 is a flow diagram illustrating an embodiment of a process for finding identical subsegments. In some embodiments, the process of FIG. 11 is used to implement 912 of FIG. 9. In the example shown, in 1101, a first subsegment is selected. In 1104, it is determined if the selected subsegment is identical to a subsegment of a previously stored likely similar segment. The determination of a subsegment being identical to another uses fingerprints. If the selected subsegment is identical to a subsegment of a previously stored likely similar segment, then in 1112 it is indicated that the selected subsegment is identical, and control passes to 1108. If the selected subsegment is not identical to a subsegment of a previously stored likely similar segment, then in 1106 it is indicated that the selected subsegment is not identical, and control passes to 1108. In 1108, it is determined if there are more subsegments to process. If there are, then in 1110 the next subsegment is selected and control passes to 1104. If not, then the process ends.

In some embodiments, the subsegment processing is with regards to transmitting a subsegment or replicating a subsegment. In these cases, the comparisons are with previously transmitted or replicated subsegments and after indicating that the subsegment is identical to a previously transmitted or replicated subsegment, transmitting or replicating by using a reference instead of the subsegment content.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for transmitting or storing subsegments comprising:
   receiving a data stream or a data block;
   breaking the data stream or the data block into a plurality of segments;
   for at least one segment:
      breaking the at least one segment into a plurality of subsegments;
      identifying a previously stored or transmitted segment similar to but not identical to the at least one segment, wherein the identification is based at least in part on a value based on one or more of content of the at least one segment and metadata associated with the at least one segment;
      computing a fingerprint for at least one subsegment of the at least one segment; and
      using the fingerprint for the at least one subsegment of the at least one segment, determining whether the at least one subsegment is identical to a subsegment of the previously stored or transmitted segment that has been identified as similar to but not identical to the at least one segment, wherein determining comprises determining without directly comparing the content of the at least one subsegment with the content of the subsegment of the previously stored or transmitted segment.

2. The method as in claim 1, wherein breaking the data stream or the data block into a plurality of segments is based at least in part on at least a portion of content of the data stream or the data block.

3. The method as in claim 1, wherein breaking the data stream or the data block into a plurality of segments is based on one or more of the following: a hash of at least a portion of content of the data stream or the data block, a fixed periodic, boundary for the data stream or data block, a file boundary, or a directory boundary.

4. The method as in claim 1, wherein breaking the at least one segment into a plurality of subsegments is based at least in part on at least a portion of content of the segment.

5. The method as in claim 1, wherein the plurality of subsegments includes one of the following: subsegments that do not overlap with one another, subsegments that have gaps between each other, subsegments that overlap with another, some subsegments that overlap with one another and some subsegments that do not overlap with one another.

6. The method as in claim 1, wherein identifying a previously stored or transmitted segment similar to but not identical to the at least one segment includes using a tag.

7. The method as in claim 6, wherein the tag is based at least in part on the content of the data stream or the data block.

8. The method as in claim 6, wherein the tag comprises one or more of the following: a sketch, a fingerprint of some or all of the at least one segment, and hash of some or all of the at least one segment.

9. The method as in claim 6, wherein the tag comprises one or more of the following included in the data stream or the data block and associated with the at least one segment: a file name, a file size, a file create date and time, a file modify date and time, and a file inode number.

10. The method as in claim 6, wherein the tag is based at least in part on metadata associated with but not a part of the content of the data stream or the data block.

11. The method as in claim 6, wherein the tag comprises a name of a file, a directory, or a data stream associated with, but not a part of the content of the data stream or the data block.

12. The method as in claim 6, wherein the tag is sent to a remote or replica system.

13. The method as in claim 6, wherein the tag is stored in a tag index.

14. The method as in claim 1, wherein the previously stored or transmitted segment similar to but not identical to the at least one segment is one of a plurality of previously stored or transmitted segments similar to but not identical to the at least one segment.

15. The method as in claim 1, wherein determining whether the at least one subsegment is identical to a subsegment of the previously stored or transmitted segment includes using a fingerprint of the subsegment of the previously stored or transmitted segment.

16. The method as in claim 15, wherein the fingerprint of the subsegment of the previously stored or transmitted segment is read from a storage device.

17. The method as in claim 16, wherein the fingerprint is part of a file system data structure that associates the subsegment with an offset within a file.

18. The method as in claim 15, wherein the fingerprint of the subsegment of the previously stored or transmitted segment is sent to a remote system over a network.

19. The method as in claim 15, wherein the fingerprint of the subsegment of the previously stored or transmitted segment is received from a remote system over a network.

20. The method as in claim 19, wherein the remote system reads the fingerprint of the subsegment of the previously stored or transmitted segment from a storage device.

21. The method as in claim 19, wherein the remote system computes the fingerprint of the subsegment of the previously stored or transmitted segment.

22. The method as in claim 1, wherein determining whether the at least one subsegment is identical to a subsegment of the previously stored or transmitted segment includes comparing the fingerprint for the at least one subsegment with a fingerprint for the subsegment of the previously stored or transmitted segment to see if the two fingerprints are identical.

23. The method as in claim 1, wherein the previously stored or transmitted segment is stored on a remote or replica system.

24. The method as in claim 1, further comprising not sending the at least one subsegment to a remote or replica system in the event that it is determined that the at least one subsegment is identical to any subsegment of the previously stored or transmitted segment.

25. The method as in claim 1, further comprising storing a reference to the subsegment of the previously stored or transmitted segment in the event that it is determined that the at least one subsegment is identical to a subsegment of the previously stored or transmitted segment on a remote or a replica system instead of storing the at least one subsegment.

26. The method as in claim 25, wherein storing the reference comprises storing the reference on a remote system.

27. The method as in claim 25, wherein storing the reference comprises storing the reference on a replica system.

28. The method as in claim 1, further comprising transmitting a reference to the subsegment of the previously stored or transmitted segment in the event that it is determined that the at least one subsegment is identical to a subsegment of the previously stored or transmitted segment on a remote or a replica system instead of transmitting the at least one subsegment.

29. The method as in claim 1, wherein the fingerprint for the at least one subsegment is stored.

30. The method as in claim 1, wherein the fingerprints for two or more of the plurality of subsegments of the at least one segment are stored together for easy retrieval as a group.

31. The method as in claim 1, wherein the fingerprint for the at least one subsegment is stored as part of a file system data structure that associates subsegments with particular offsets within a file.

32. The method as in claim 1, wherein the fingerprints for two or more subsegments of a previously stored or transmitted segment similar to but not identical to the at least one segment are stored as part of a file system data structure that associates subsegments with particular offsets within a file.

33. The method as in claim 1, wherein two or more fingerprints for two or more subsegments of a previously stored or transmitted segment similar to but not identical to the at least one segment are retrieved together as a group.

34. The method as in claim 33, wherein the two or more fingerprints for two or more subsegments of a previously stored or transmitted segment similar to but not identical to the at least one segment are read in a single operation from a storage device.

35. The method as in claim 1, wherein the plurality of segments includes one of the following: segments that do not overlap with one another, segments that have gaps between each other, segments that overlap with another, some segments that overlap with one another and some segments that do not overlap with one another.

36. A system for transmitting or storing subsegments comprising:
    a processor; and
    a memory coupled with the processor, wherein the memory is configured to provide the processor with instructions which when executed cause the processor to:
    receive a data stream or a data block;
    break the data stream or the data block into a plurality of segments;
    for at least one segment:
        break the at least one segment into a plurality of subsegments;
        identify a previously stored or transmitted segment similar to but not identical to the at least one segment, wherein the identification is based at least in part on a value based on one or more of content of the at least one segment and metadata associated with the at least one segment;
        compute a fingerprint for at least one subsegment of the at least one segment; and using the fingerprint for the at least one subsegment of the at least one segment, determine whether the at least one subsegment is identical to a subsegment of the previously stored or transmitted segment that has been identified as similar to but not identical to the at least one segment, wherein determining comprises determining without directly comparing the content of the at least one subsegment with the content of the subsegment of the previously stored or transmitted segment.

37. A computer program product for transmitting or storing subsegments, the computer program product being embodied in a non-transitory computer readable storage medium and comprising computer instructions for;
receiving a data stream or a data block;
breaking the data stream or the data block into a plurality of segments;
for at least one segment:
breaking the at least one segment into a plurality of subsegments;
identifying a previously stored or transmitted segment similar to but not identical to the at least one segment, wherein the identification is based at least in part on a value based, on one or more of content of the at least one segment and metadata associated with the at least one segment;
computing a fingerprint for at least one subsegment of the at least one segment; and
using the fingerprint for the at least one subsegment of the at least one segment, determining whether the at least one subsegment is identical to a subsegment of the previously stored or transmitted segment that has been identified as similar to but not identical to the at least one segment, wherein determining comprises determining without directly comparing the content of the at least one subsegment with the content of the subsegment of the previously stored or transmitted segment.

38. A method for identifying duplicate subsegments comprising:
receiving a data stream or a data block;
breaking the data stream or the data block into a plurality of segments;
for at least one segment:
identifying a previously stored or transmitted segment likely similar to but not identical to the at least one segment, wherein the identification is based at least in part on a value based on one or more of content of the at least one segment and metadata associated with the at least one segment;
reading one or more fingerprints of a plurality of subsegments of the previously stored or transmitted segment; and
determining whether a subsegment of the at least one segment is identical to a subsegment of the previously stored or transmitted segment likely similar to but not identical to the at least one segment using the one or more fingerprints.

39. The method as in claim 38, wherein the one or more fingerprints are read as part of a file system data structure that associates the subsegments with offsets within a file.

40. The method as in claim 38, wherein reading the one or more fingerprints comprises reading from a storage device.

41. The method as in claim 38, wherein reading the one or more fingerprints comprises reading the one or more fingerprints from a remote or a replica system storage device.

42. The method as in claim 38, wherein the data stream or the data block is broken into a plurality of segments based on content of the data stream or the data block.

43. The method as in claim 38, wherein the data stream or the data block is broken into a plurality of segments based on a hash of at least a portion of content of the data stream or the data block.

44. The method as in claim 38, wherein the data stream or the data block is broken into a plurality of segments based on a fixed periodic boundary for the data stream or data block, a file boundary, or a directory boundary.

45. The method as in claim 38, wherein each segment of the plurality of segments is broken into subsegments to create a plurality of subsegments.

46. The method as in claim 45, wherein the each segment of the plurality of segments is broken into subsegments based at least in part on at least a portion of content of the segment.

47. The method as in claim 45, wherein the plurality of subsegments includes subsegments that do not overlap with one another.

48. The method as in claim 45, wherein the plurality of subsegments includes subsegments that have gaps between each other.

49. The method as in claim 45, wherein the plurality of subsegments includes subsegments that overlap with another.

50. The method as in claim 45, wherein the plurality of subsegments includes, some subsegments that overlap with one another and some subsegments that do not overlap with one another.

51. The method as in claim 38, wherein the previously stored or transmitted segment likely similar to but not identical to the at least one segment is identified using a tag.

52. The method as in claim 51, wherein the tag is based at least in part on the content of the data stream or the data block.

53. The method as in claim 51, wherein the tag is based at least in part on metadata associated with but not a part of the content of the data stream or the data block.

54. The method as in claim 38, wherein the plurality of segments includes segments that do not overlap with one another.

55. The method as in claim 38, wherein the plurality of segments includes segments that have gaps between each other.

56. The method as in claim 38, wherein the plurality of segments includes segments that overlap with another.

57. The method as in claim 38, wherein the plurality of segments includes some segments that overlap with one another and some segments that do not overlap with one another.

58. A system for identifying duplicate subsegments comprising:
a processor; and
a memory coupled with the processor, wherein the memory is configured to provide the processor with instructions which when executed cause the processor to:
receive a data stream or a data block;
break the data stream or the data block into a plurality of segments
for at least one segment:
identify a previously stored or transmitted segment likely similar to but not identical to the at least one segment, wherein the identification is based at least in part on a value based on one or more of content of the at least one segment and metadata associated with the at least one segment;

read one or more fingerprints of a plurality of subsegments of the previously stored or transmitted segment; and determine whether a subsegment of the at least one segment is identical to a subsegment of the previously stored or transmitted segment likely similar to but not identical to the at least one segment using the one or more fingerprints.

59. A computer program product for identifying duplicate subsegments, the computer program product being embodied in a non-transitory computer readable storage medium and comprising computer instructions for:

receiving a data stream or a data block;

breaking the data stream or the data block into a plurality of segments for at least one segment:

identifying a previously stored or transmitted segment likely similar to but not identical to the at least one segment, wherein the identification is based at least in part on a value based on one or more of content of the at least one segment and metadata associated with the at least one segment;

reading one or more fingerprints of a plurality of subsegments of the previously stored or transmitted segment; and determining whether a subsegment of the at least one segment is identical to a subsegment of the previously stored or transmitted segment likely similar to but not identical to the at least one segment using the one or more fingerprints.

* * * * *